(12) United States Patent
Kim

(10) Patent No.: US 9,800,189 B2
(45) Date of Patent: Oct. 24, 2017

(54) APPARATUS FOR CONTROLLING INVERTER

(71) Applicant: LSIS CO., LTD., Anyang-si, Gyeonggi-do (KR)

(72) Inventor: Junghan Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/930,235

(22) Filed: Nov. 2, 2015

(65) Prior Publication Data

US 2016/0134219 A1    May 12, 2016

(30) Foreign Application Priority Data

Nov. 12, 2014  (KR) .................. 10-2014-0156848

(51) Int. Cl.
| | |
|---|---|
| H02P 3/18 | (2006.01) |
| H02P 23/00 | (2016.01) |
| H02P 25/00 | (2006.01) |
| H02P 27/00 | (2006.01) |
| H02P 23/14 | (2006.01) |
| H02P 21/14 | (2016.01) |
| H02P 23/08 | (2006.01) |
| H02P 27/04 | (2016.01) |
| H02P 21/06 | (2016.01) |
| H02P 23/03 | (2006.01) |
| H02P 25/04 | (2006.01) |

(Continued)

(52) U.S. Cl.
CPC .............. *H02P 23/14* (2013.01); *H02P 21/06* (2013.01); *H02P 21/146* (2013.01); *H02P 23/03* (2013.01); *H02P 23/08* (2013.01); *H02P 27/047* (2013.01); *H02M 7/48* (2013.01); *H02P 25/04* (2013.01); *H02P 27/02* (2013.01); *H02P 27/06* (2013.01)

(58) Field of Classification Search
CPC .......... H02P 27/02; H02P 25/04; H02P 27/06; H02P 27/08; H02M 7/48
USPC ........................................................ 318/812
See application file for complete search history.

(56) References Cited

U.S. PATENT DOCUMENTS

| | | | | |
|---|---|---|---|---|
| 2001/0043481 | A1* | 11/2001 | Sakai | ...................... H02M 7/48 363/131 |
| 2003/0020432 | A1* | 1/2003 | Sakai | ...................... H02P 21/34 318/801 |

(Continued)

FOREIGN PATENT DOCUMENTS

| | | |
|---|---|---|
| EP | 2618479 | 7/2013 |
| JP | 7-107771 | 4/1995 |

(Continued)

OTHER PUBLICATIONS

European Patent Office Application Serial No. 15193324.9, Search Report dated Apr. 7, 2016, 7 pages.

(Continued)

*Primary Examiner* — Kawing Chan
*Assistant Examiner* — Bradley Brown
(74) *Attorney, Agent, or Firm* — Lee Hong Degerman Kang & Waimey

(57) ABSTRACT

An inverter controller is provided. The controller according to an exemplary embodiment of the present disclosure generates a compensation voltage to compensate an inverter command voltage using motor torque current and motor information, and apply the compensation voltage to the command voltage.

6 Claims, 2 Drawing Sheets

(51) Int. Cl.
*H02M 7/48* (2007.01)
*H02P 27/02* (2016.01)
*H02P 27/06* (2006.01)

(56) References Cited

U.S. PATENT DOCUMENTS

| | | | | |
|---|---|---|---|---|
| 2005/0264255 | A1* | 12/2005 | Maruyama | H02P 21/09 318/808 |
| 2006/0215429 | A1* | 9/2006 | Oka | H02P 21/22 363/97 |
| 2012/0194110 | A1* | 8/2012 | Konig | H02P 27/08 318/400.17 |
| 2014/0197765 | A1* | 7/2014 | Kim | H02P 29/0038 318/400.2 |

FOREIGN PATENT DOCUMENTS

| | | |
|---|---|---|
| JP | 11-103597 | 4/1999 |
| JP | 2001-314090 | 11/2001 |

OTHER PUBLICATIONS

Japan Patent Office Application Serial No. 2015-221452, Office Action dated Sep. 20, 2016, 3 pages.

\* cited by examiner

APPARATUS FOR CONTROLLING INVERTER

CROSS-REFERENCE TO RELATED APPLICATIONS

Pursuant to 35 U.S.C. §119(a), this application claims the benefit of earlier filing date and right of priority to Korean Patent Application No. 10-2014-0156848, filed on Nov. 12, 2014, the contents of which are hereby incorporated by reference herein in its entirety.

BACKGROUND

Field of the Disclosure

The present disclosure relates to an apparatus for controlling an inverter.

Discussion of the Related Art

An inverter is a power converter that coverts inputted AC (Alternating Current) electric power to DC (Direct Current) electric power, converts the DC electric power to a voltage having magnitude and frequency required by a motor, and output the voltage to the motor.

The conventional inverter operation control is a method to constantly control gap flux in all frequency areas under the base frequency, that is, to control magnetic flux ingredient current of the stator current. The overall current is increased by the effect of voltage drop due to the stator resistance at low velocity. However, the performance is superior to control with only general voltage/frequency relationships, in a case when a large amount of starting torque is required at an initial stage.

However, there are problems in that the method is largely dependent on motor parameters (stator resistance, stator inductance, no-load current), errors occur in the torque boost compensation voltage due to errors in the relevant parameters, and thereby the operation may fail at a large starting torque, in a case when such controlling method is applied to operation of industrial inverters.

In particular, the control of a certain voltage/frequency is to output a voltage corresponding to the frequency required by a predetermined ratio of voltage and frequency. Therefore, there is still a problem in that the operation may fail when a large starting torque is required at low velocity or when there is a large change in load.

SUMMARY OF THE DISCLOSURE

One of purposes that the present disclosure intends to achieve is, to provide an inverter controller that enables the inverter to stably operate even when a large starting torque is required for the inverter to be driven, or even when there is a large change in load.

In a general aspect of the present disclosure, a controller is provided, the controller comprising: a first generation unit configured to generate a voltage command from a command frequency; a first conversion unit configured to convert an output current of an inverter to a torque current on synchronous reference frame; and a second generation unit configured to generate a compensation voltage to compensate the voltage command using the torque current and motor information, wherein the compensation voltage may be applied to the first generation unit.

In some exemplary embodiments of the present disclosure, the controller may further comprise: a second conversion unit configured to convert the voltage command to a voltage command on a stationary reference frame; a modulation unit configured to modulate the voltage command on the stationary reference frame according to a motor rating; and a third generation unit configured to generate a PWM (Pulse Width Modulation) signal in order to control a plurality of power switching elements of the inverter, according to the modulated voltage command on the stationary reference frame.

In some exemplary embodiments of the present disclosure, the controller may further comprise: an LPF (Low Pass Filter) configured to control harmonic wave ingredient of the torque current.

In some exemplary embodiments of the present disclosure, the second generation unit may include: a fourth generation unit configured to generate a boost voltage according to the motor information and a predetermined voltage gain; and a first multiplication unit configured to generate a compensation voltage by multiplying a K-factor of the torque current by the boost voltage.

In some exemplary embodiments of the present disclosure, the second generation unit may include: a comparison unit configured to compare the torque current with a torque current reference.

In some exemplary embodiments of the present disclosure, the comparison unit may output a value of 1 when the torque current is greater than the torque current reference, and may output a value of 0 when the torque current is not greater than the torque current reference.

In some exemplary embodiments of the present disclosure, the second generation unit may further include: a second multiplication unit configured to multiply an output of the comparison unit and by output of the fourth generation unit.

In some exemplary embodiments of the present disclosure, the second generation unit may further include: a limitation unit configured to limit the compensation voltage below a predetermined voltage.

In some exemplary embodiments of the present disclosure, the motor information may include a slip frequency of the motor and a capacity of the motor.

According to an exemplary embodiment of the present disclosure, there is an advantageous effect of stably driving the inverter, because the compensation voltage is determined according to the status of load even when a large starting torque is required or even when there is a large change in load.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

The terms used in the present disclosure, including ordinal numbers such as "first" or "second", may be used for description of various elements. However, the elements of the present disclosure shall not be limited by such the terms.

An expression used in the singular encompasses the expression of the plural, unless it has clearly different meaning in the context. In the present specification, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Hereinafter, an exemplary embodiment of the present disclosure will be described in detail with reference to the accompanying drawings.

Figure 1:
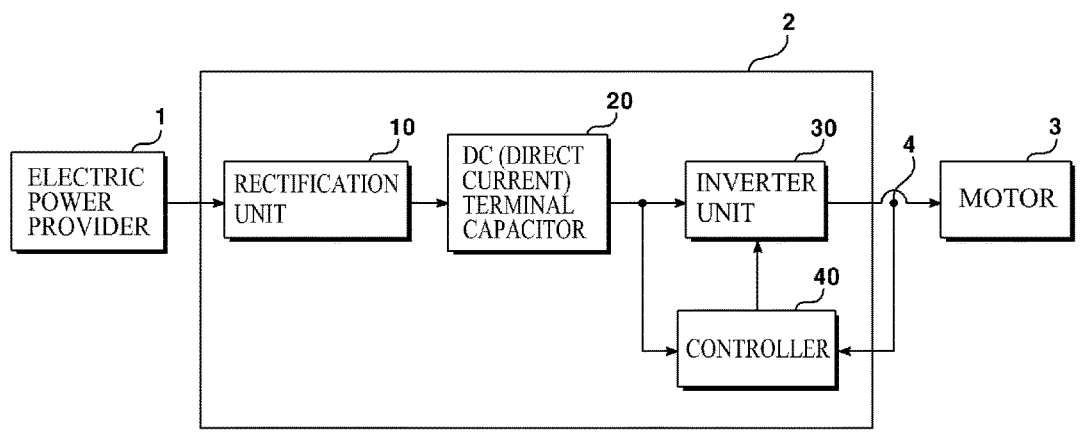
FIG. 1 is an exemplary view illustrating a structure of an inverter system according to an exemplary embodiment of the present disclosure.

FIG. 1 is an exemplary view illustrating a structure of an inverter system according to an exemplary embodiment of the present disclosure.

As illustrated in FIG. 1, an inverter (2) may receive a three-phase electric power from a three-phase electric power provider (1), convert the three-phase electric power to voltage having predetermined amount and frequency and provide the voltage to a motor (3), and may include a rectification unit (10), a DC (Direct Current) terminal capacitor (20), an inverter unit (30) and a controller (40).

The rectification unit (10) may convert an inputted AC (Alternating Current) voltage to a DC (Direct Current) voltage. The rectification unit (10) may be formed of a plurality of diodes.

The DC terminal voltage increases, when the input electric power supplied from the power supply is greater than the output electric power consumed at the load. In the reverse case, the DC terminal voltage decreases. The DC terminal capacitor (20) may be used in order to resolve the instantaneous electric power imbalance at input/output terminals.

In addition, the inverter unit (30) may include a plurality of power switching elements. On/Off of the plurality of power switching elements may be controlled by a PWM (Pulse Width Modulation) signal of the controller (40), so that the inverter unit (30) may output a voltage having predetermined amount and frequency to the motor (3). Here, the power switching element may be an IGBT (Insulated Gate Bipolar Transistor), but not limited hereto, thus, various power switching elements may be used.

The current detection unit (4) may detect an output of the inverter (2), that is, may detect input current of the motor (3). The current detected by the current detection unit (4) may be used for protective operation of the motor (3). For example, the current detection unit (4) may be a CT (Current Transformer), but not limited hereto. Various devices to perform such functions may be applied as the current detection unit (4).

Hereinafter, the structure of a conventional controller will be described. In addition, the structure of the controller according to an exemplary embodiment of the present disclosure will be described with reference to drawings.

Figure 2:
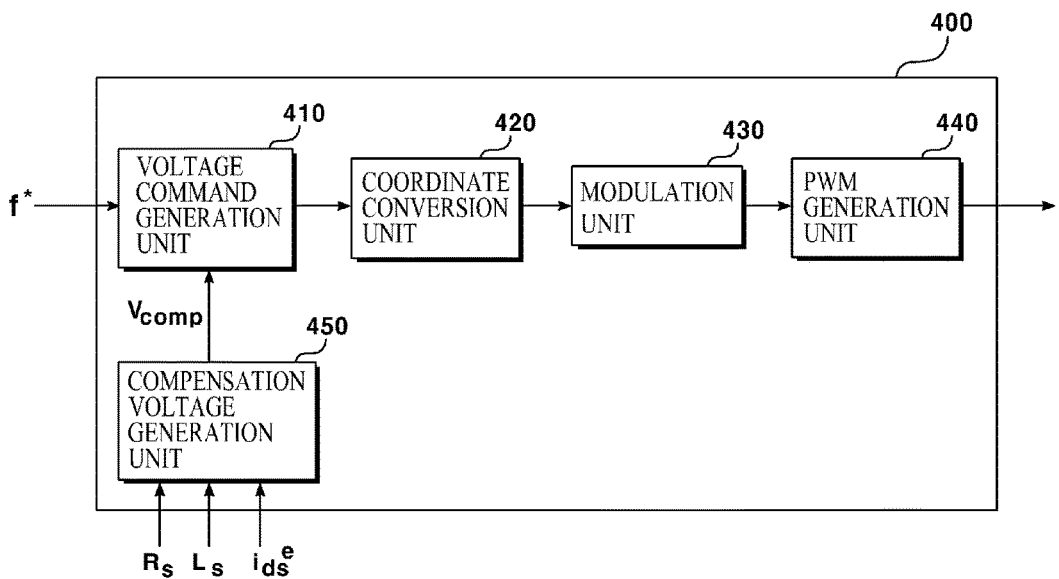
FIG. 2 is a block diagram illustrating a controller of a conventional inverter system.

FIG. 2 is a block diagram illustrating a controller of a conventional inverter system.

As illustrated in the figure, the conventional controller (400) to control the inverter may include a voltage command generation unit (410), a coordinate conversion unit (420), a modulation unit (430), a PWM generation unit (440) and a compensation voltage generation unit (450). The controller (400) is a control device for voltage-frequency constant control, which controls the inverter in a case when a rotor location sensor is not configured.

The voltage command generation unit (410) may generate a voltage command from a command frequency. The coordinate conversion unit (420) may coordinate-convert the voltage command received from the voltage command generation unit (410) to a three-phase voltage command on a stationary reference frame.

The modulation unit or AVR (automatic voltage regulator) (430) may control the voltage of the coordinate conversion unit (420) to be compliant with the motor rating. The PWM generation unit (440) may generate a PWM signal for controlling the plurality of power switching elements of the inverter unit (30) according to the voltage command.

Here, the gap flux decreases and thereby the output torque decreases, due to voltage drop by the stator resistance at low velocity, when the voltage-frequency constant control is performed. Increasing the voltage at low velocity in order to compensate the decreased torque is referred to as a torque booster. The compensation voltage generation unit (450) generates a compensation voltage by calculating the amount of torque boost using motor parameters (stator resistance, stator inductance, no-load current) and provides the compensation voltage to the command voltage generation unit (410), so as to compensate the voltage command when a larger amount of starting torque.

However, there are problems in that the compensation voltage generated by the conventional compensation voltage generation unit is largely dependent on motor parameters, errors in compensation voltage occur due to such errors in the relevant parameters, and thereby the operation may fail at a large staring torque.

One purpose of the controller (40) according to an exemplary embodiment of the present disclosure is to resolve such problems. The controller (40) according to an exemplary embodiment of the present disclosure may stably drive the inverter even when a large starting torque is required, or even when there occurs a large change in load.

Figure 3:
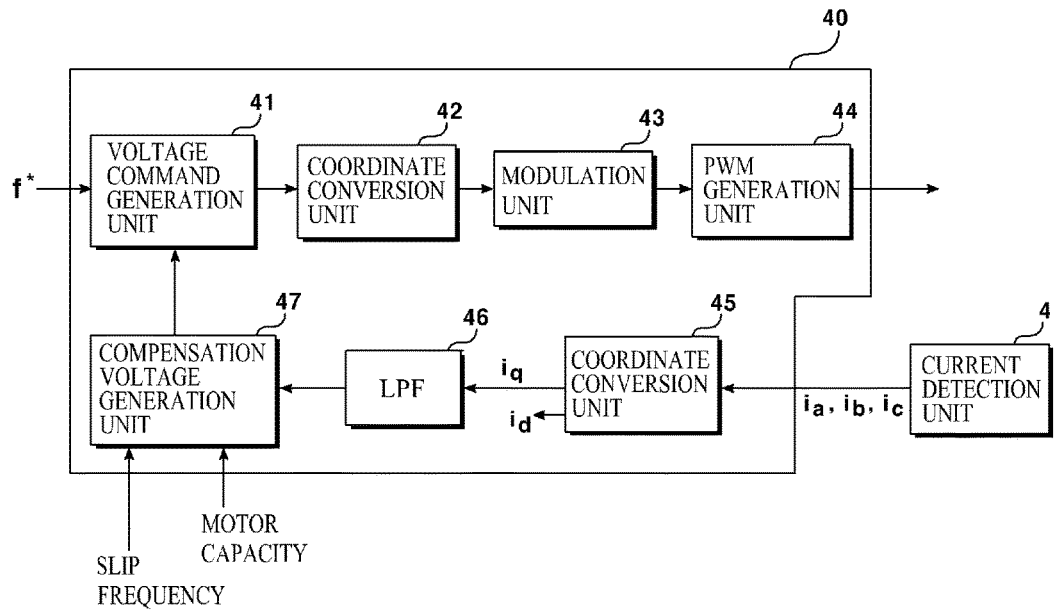
FIG. 3 is an exemplary view illustrating a controller of the inverter system of FIG. 1 according to an exemplary embodiment of the present disclosure.

FIG. 3 is an exemplary view illustrating a controller (40) of the inverter system of FIG. 1 according to an exemplary embodiment of the present disclosure.

As illustrated in FIG. 3, the controller (40) of an inverter according to an exemplary embodiment of the present disclosure may include a voltage command generation unit (41), a first coordinate conversion unit (42), a modulation unit (43), a PWM generation unit (44), a second coordinate conversion unit (45), an LPF (Low Pass Filter) (46) and a compensation voltage generation unit (47).

The controller (40) according to an exemplary embodiment of the present disclosure may be used when a rotor location sensor of the motor (3) is not provided, but not limited hereto. The controller (40) according to an exemplary embodiment of the present disclosure may be also used when a rotor location sensor of the motor (3) is provided.

The voltage command generation unit (41) may generate a voltage command from a predetermined command frequency. The coordinate conversion unit (42) may coordinate-convert the voltage command generated by the voltage command generation unit (41) to a three-phase voltage command.

The modulation unit or AVR (43) may modulate the voltage outputted by the coordinate conversion unit (42) to be complaint with the motor rating. In addition, the PWM generation unit (44) may generate a PWM signal for controlling a plurality of power switching elements of the inverter unit (30) according to the modulated voltage command. Descriptions for specific operations of the modulation unit (43) and the PWM generation unit (44) are obvious to those skilled in the art to which the present disclosure pertains, and therefore will be omitted.

The second coordinate conversion unit (45) may receive an output current of the inverter (2) from the current detection unit (4), and may convert the output current to d-axis current and q-axis current on a synchronous reference frame. Here, the d-axis current may be magnetic flux ingredient (magnetic flux current) of the inverter (2) output current, and the q-axis current may be torque ingredient (torque current) of the inverter (2) output current.

The LPF (46) may remove harmonic wave by filtering torque current. Afterwards, the compensation voltage generation unit (47) may receive slip frequency of the motor (3) and the motor (3) capacity information, may generate a compensation voltage based on the received slip frequency, capacity information and a predetermined boost voltage gain, and may provide the compensation voltage to the voltage command generation unit (41).

As an initial overcurrent flows at large amount the compensation when slip frequency increases in the motor (3), the voltage generation unit (47) may accordingly generate a proper compensation voltage. In addition, as the output current may be various by capacity of the motor (3) of a general inverter (2), the voltage generation unit (47) may generate a compensation voltage according to the motor (3) capacity information having a default gain. In addition, in consideration of the voltage gain, greater voltage may be compensated compared to the conventional voltage/frequency constant control. Therefore, an exemplary embodiment of the present disclosure is useful when a great starting torque is required or when using auto adjustment function.

Figure 4:
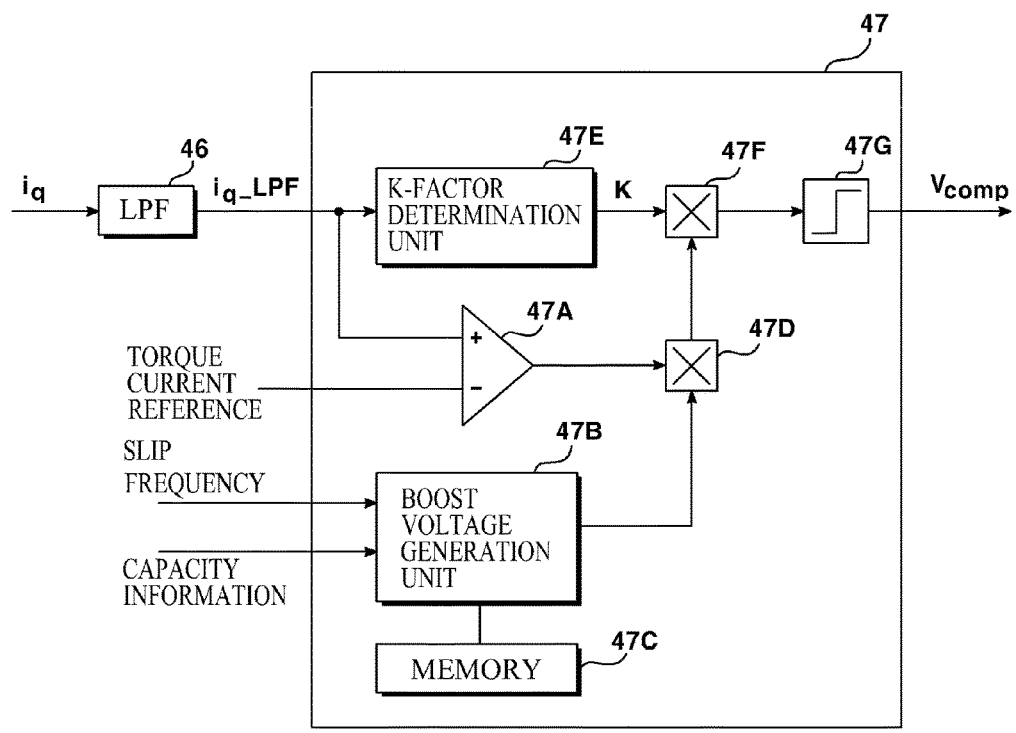
FIG. 4 is a detailed block diagram illustrating a compensation voltage generation unit of FIG. 3 according to an exemplary embodiment of the present disclosure.

FIG. 4 is a detailed block diagram illustrating a compensation voltage generation unit of FIG. 3 according to an exemplary embodiment of the present disclosure.

As illustrated in FIG. 4, the compensation voltage generation unit (47) according to an exemplary embodiment of the present disclosure may include a comparison unit (47A), a boost voltage generation unit (47B), a memory (47C), first and second multiplication unit (47D, 47F), a K-factor determination unit (47E) and a limitation unit (47G). According to an exemplary embodiment of the present disclosure, an example where the compensation voltage generation unit (47) includes a memory (47C) pre-storing a predetermined voltage gain. However, the present disclosure is not limited hereto. It will be apparent, to those skilled in the art to which the present disclosure pertains, that receiving the voltage gain from an external memory is not excluded in the present disclosure.

The torque current may be outputted from the second coordinate conversion unit (45) of FIG. 3, and harmonic wave ingredient included in the torque current may be filtered by the LPF (46).

The comparison unit (47A) may compare the torque current in which harmonic wave is filtered with the torque current reference for voltage compensation. The torque current reference may be predetermined. Therefore, according to comparison of the comparison unit (47A) the compensation voltage may be generated when the torque current is greater than the torque current reference. That is, the comparison unit (47A) may output a value of 1 when the torque current is greater than the torque current reference, and may output a value of 0 when the torque current is not greater than the torque current reference.

Meanwhile, the slip frequency may be different by every motor (3), and the initial starting current of an induction motor becomes greater as the slip frequency becomes greater. Thus, the boost voltage according to an exemplary embodiment of the present disclosure may be determined based on the slip frequency. In addition, as the rated output current may be different by capacity of the motor (3), the parameters of the motor (3) may become different. Therefore, the gain of boost voltage may also be affected, and the boost voltage may be determined based on capacity information of the motor (3).

In addition, the boost voltage generation unit (47B) may generate the boost voltage also based on voltage gain stored in the memory (47C).

The boost voltage generated by such manners may be multiplied by a value of 1 outputted by the comparison unit (47A) and by the first multiplication unit (47D), and may be provided to the second multiplication unit (47F). In a case when the torque current is smaller than the torque current reference, the comparison unit (47A) outputs a value of 0 (zero). Thus, the compensation voltage may not be outputted.

However, such embodiment is just for the purpose of an example. Other parameters than slip frequency, motor capacity information and voltage gain of the motor may be considered by the boost voltage generation unit (47B) to determine the boost voltage.

The K-factor determination unit (47E) may determine a K-factor from the torque current filtered through the LPF (46), and the second multiplication unit (47F) may generate a compensation voltage by multiplying the K-factor by the boost voltage generated by the boost voltage generation unit (47B). The K-factor may be determined according to the torque current, and the limitation unit (47G) may limit the compensation voltage when the compensation voltage is too high. The limited value may be predetermined.

As described in the above, the compensation voltage generation unit (47) according to an exemplary embodiment of the present disclosure may output a boost voltage based on slip frequency and capacity of the motor (3) and a predetermined voltage gain, only in a case when the torque current of the inverter (2) is above a predetermined reference. The boost voltage outputted in such manner may be determined based on K-factor of the torque current. Thereby, the compensation voltage may be determined according to the state of loads, even in case when a large starting torque is required or there is a wide change in load. Therefore, the inverter may be driven stably.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments within an equivalent scope. Therefore, the technical scope of the rights for the present disclosure shall be decided by the appended claims and equivalents thereof.

What is claimed is:
1. A controller comprising:
   a first generation unit configured to generate a voltage command from a command frequency;
   a first conversion unit configured to convert an output current of an inverter to a torque current on synchronous reference frame; and a second generation unit configured to generate a compensation voltage to compensate the voltage command using the torque current and motor information, wherein the second generation unit includes:

a fourth generation unit configured to generate a boost voltage according to the motor information and a predetermined voltage gain;

a first multiplication unit configured to generate a compensation voltage by multiplying a K-factor of the torque current by the boost voltage, a comparison unit configured to compare the torque current with a torque current reference, and a second multiplication unit configured to multiply an output of the comparison unit and by output of the fourth generation unit, and wherein the compensation voltage is applied to the first generation unit.

2. The controller of claim 1, further comprising:

a second conversion unit configured to convert the voltage command to a voltage command on a stationary reference frame;

a modulation unit configured to modulate the voltage command on the stationary reference frame according to a motor rating; and a third generation unit configured to generate a PWM (Pulse Width Modulation) signal in order to control a plurality of power switching elements of the inverter, according to the modulated voltage command on the stationary reference frame.

3. The controller of claim 1, further comprising:

an LPF (Low Pass Filter) configured to control harmonic wave ingredient of the torque current.

4. The controller of claim 1, wherein the comparison unit outputs a value of 1 when the torque current is greater than the torque current reference, and outputs a value of 0 when the torque current is not greater than the torque current reference.

5. The controller of claim 1, wherein the second generation unit further includes:

a limitation unit configured to limit the compensation voltage below a predetermined voltage.

6. The controller of claim 1, wherein the motor information includes a slip frequency of the motor and a capacity of the motor.

* * * * *